April 17, 1934.                R. W. SHENTON                1,954,895
                      DOWNWARD FEED TIME CONTROL TOASTER
                            Filed June 21, 1933        4 Sheets-Sheet 1
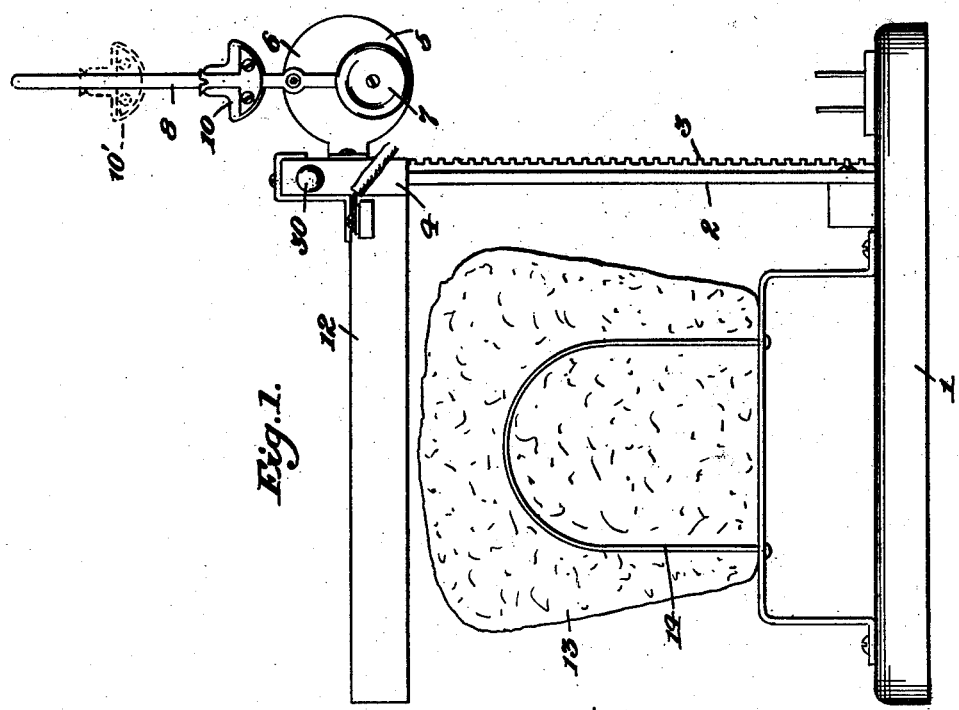
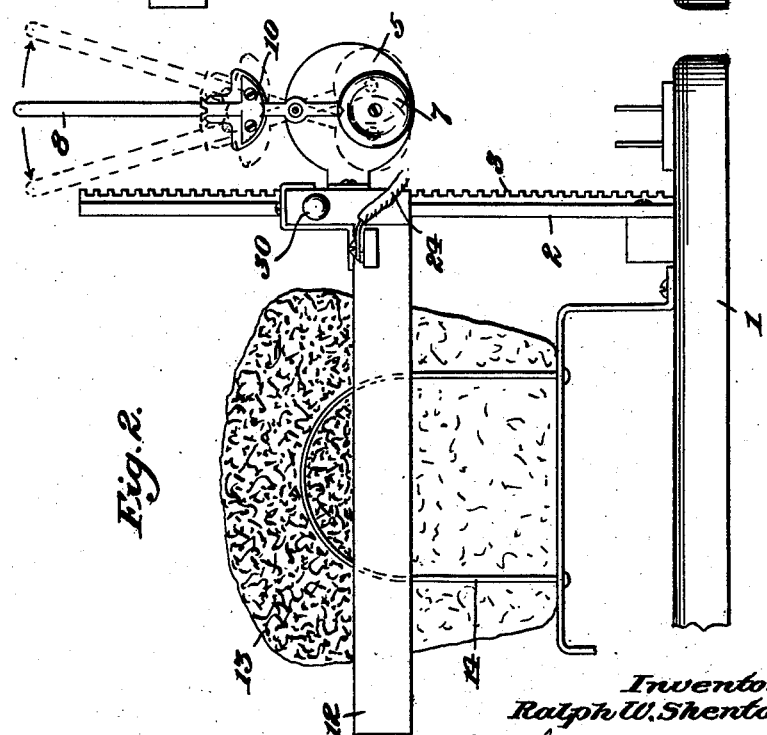
Inventor:
Ralph W. Shenton,
by Joseph W. Harris
Att'y.

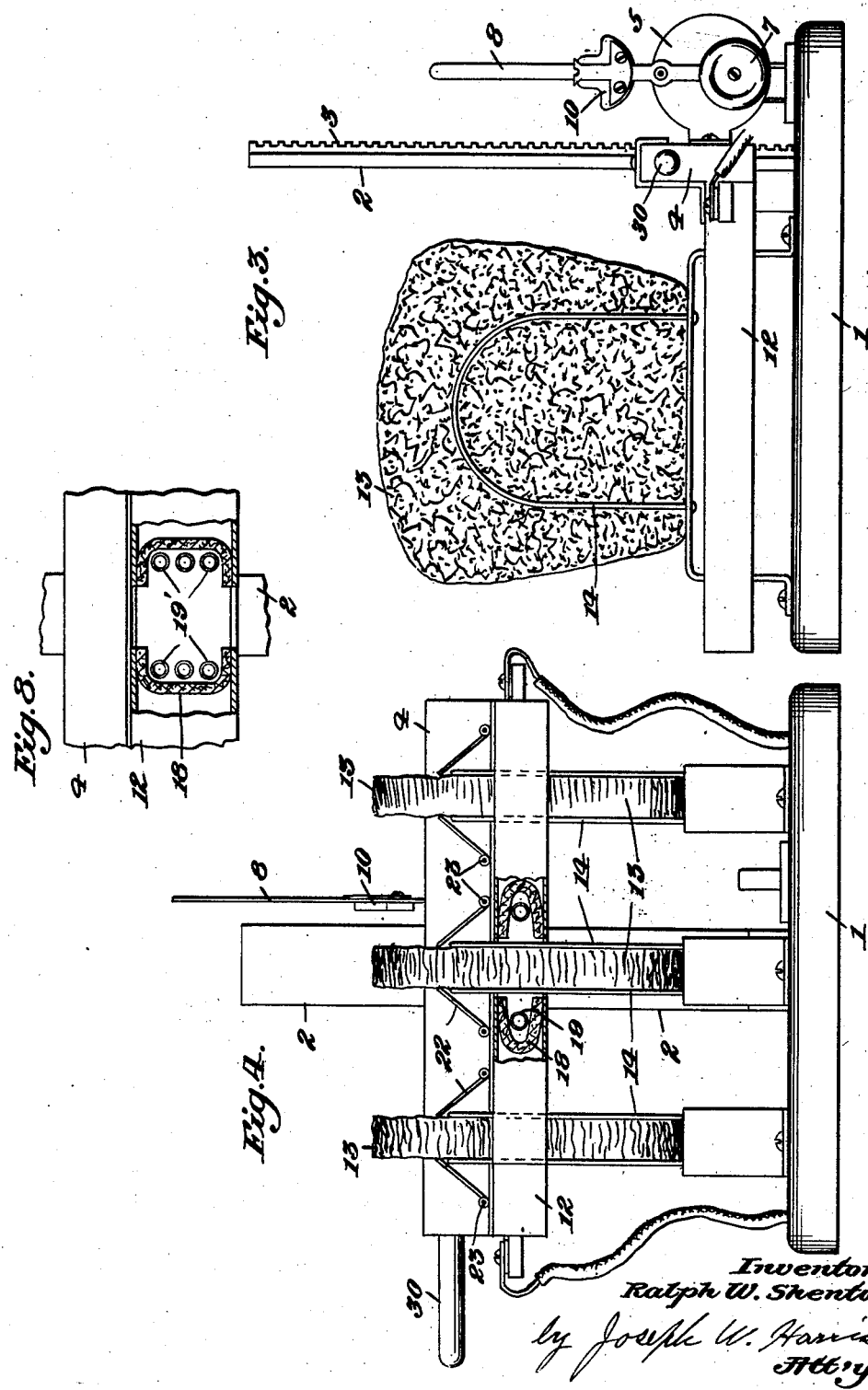

April 17, 1934.  R. W. SHENTON  1,954,895
DOWNWARD FEED TIME CONTROL TOASTER
Filed June 21, 1933  4 Sheets-Sheet 3
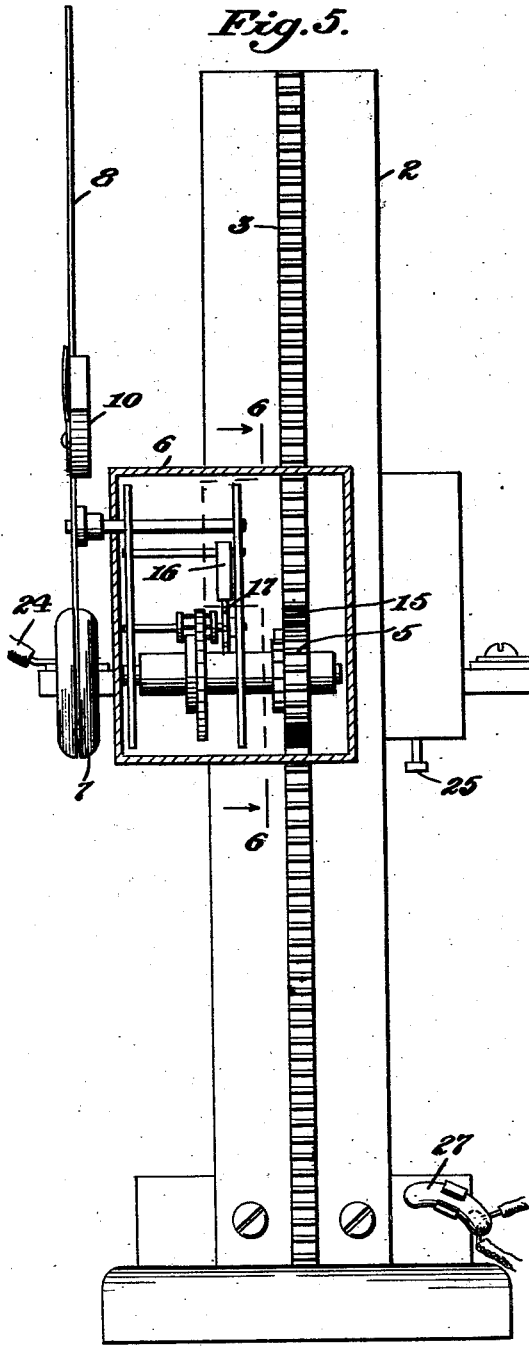
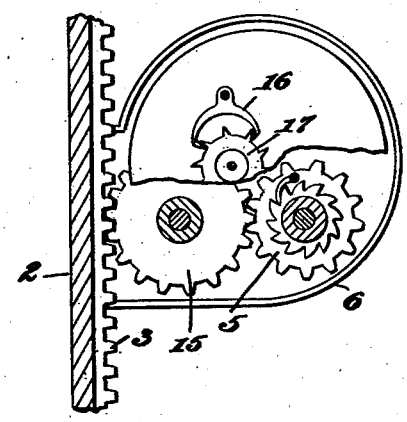
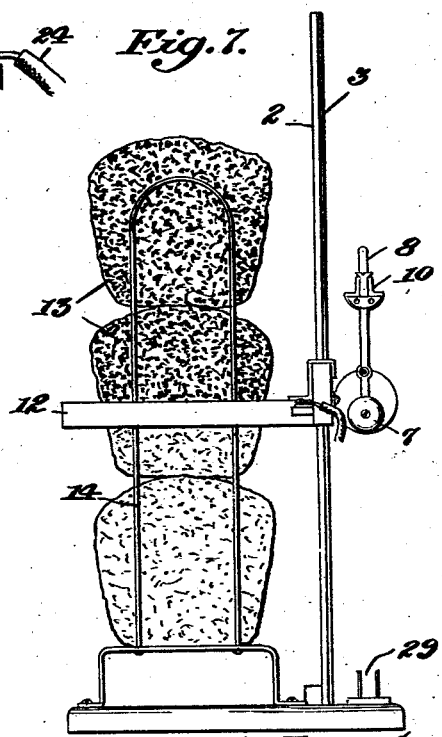
Inventor:
Ralph W. Shenton,
by Joseph W. Harris
Att'y.

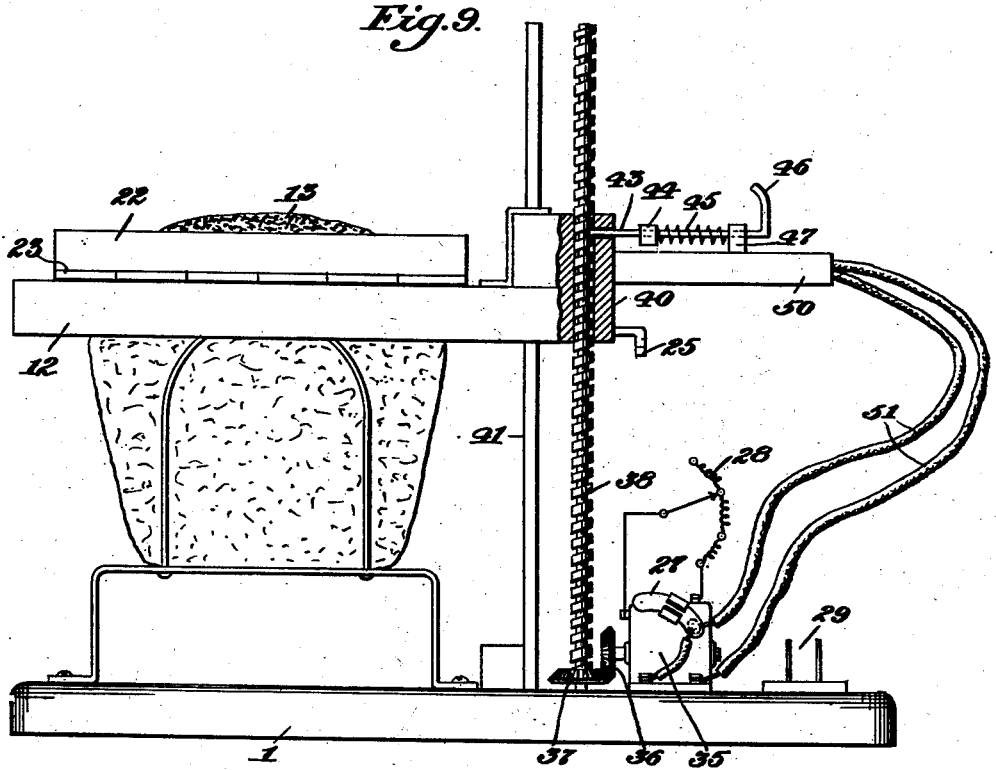
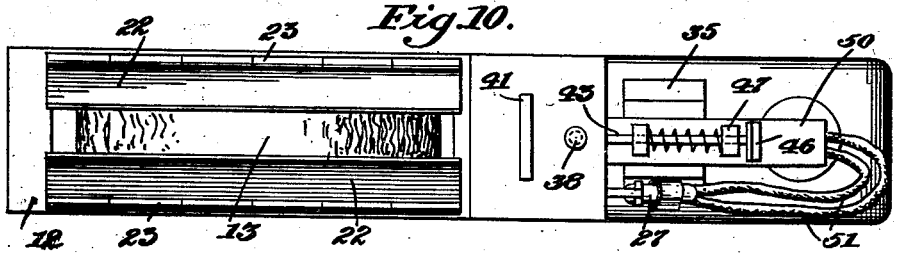
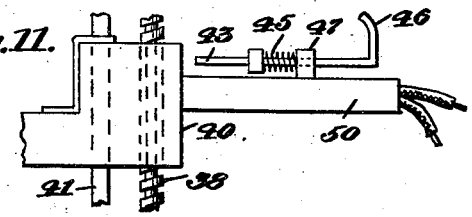

Patented Apr. 17, 1934

1,954,895

UNITED STATES PATENT OFFICE 1,954,895

DOWNWARD FEED TIME CONTROL TOASTER

Ralph W. Shenton, Shaker Heights, Ohio

Application June 21, 1933, Serial No. 676,935

7 Claims. (Cl. 219—19)

This invention relates to automatic electric toasters, particularly of a downward feed time control type which progressively toasts bread by a travelling electric heating element, which element is in operative relation to the bread to be toasted, and travels at a desired and controlled velocity to produce toast of a desired quality.

An object of the invention is to provide a toaster having a compact travelling heating element, which element will produce a travelling intense zone of heat, the bread to be toasted being progressively subjected to the influence of the travelling heat zone.

A further object is to provide a toaster having a travelling heat zone, the movement of which may be desirably controlled, depending upon the characteristics of the bread being toasted, and also on the degree of toasting desired.

A further object is to provide a toaster in which a relatively narrow travelling zone of intense heat may be applied to the bread for a short time, thereby shortening the period required to produce a desired degree of toasting.

A further object is to provide a toaster in which a relatively small amount of electric energy is consumed.

Other objects of the invention will be apparent to those skilled in the art upon reading the specification.

In the accompanying drawings,

Fig. 1 is a side elevation of one type of toaster showing the travelling heating element above the slice of bread to be toasted;

Fig. 2 is a similar view showing the heating element about half way down with the upper part of the bread toasted;

Fig. 3 is a similar view showing the heating element at the bottom with the bread completely toasted;

Fig. 4 is an end view in elevation showing a multiple toaster, with the heating element part way down, and showing a broken view of the heating element, exposing one type of heating wire;

Fig. 5 is an end view from the right of Fig. 2, with the heating element part way down, and showing an interior view of a clock-work mechanism;

Fig. 6 is a side view on the line 6—6 of Fig. 5, showing the rack, and a gear wheel meshing therewith, and also one type of escapement feed;

Fig. 7 is a side view in elevation of a further type of multiple toaster, in which the slices of bread to be toasted are placed one above the other;

Fig. 8 shows a broken view of a type of heating element in which a plurality of heating wires are used to produce an increased temperature;

Fig. 9 is a side view in elevation partly broken, of a further type of toaster in which the heating element is fed downward by a positively driven worm;

Fig. 10 is a top view of Fig. 9, and

Fig. 11 is a broken view of Fig. 9, showing a detail of the spring latch which engages the worm.

In Figs. 1, 2, and 3, upon a suitable base 1, is supported a guide 2 provided with a rack 3. Upon the guide 2 is a movable bracket 4 supporting the feeding device 5, enclosed in a casing 6, and provided with an adjustable pendulum 7, or the usual adjustable hair spring, to control the velocity of downward travel. In the illustrations, an ordinary type of metronome movement is used for the clock work movable feed 5, but any other type of controllable feed could be substituted for the metronome. The pendulum 7 is provided with an arm 8, which carries an adjustable weight 10, shown in a dotted position at 10; the upward or downward adjustment of the weight 10 on the arm 8 controlling the "beat" of the pendulum. The bracket 4, slidably mounted on the guide 2, the feeding device 5, and the heating element 12, collectively constitute a weight which tends to slide down the guide. The feeding device is provided with a gear wheel 15, Fig. 6, which engages the rack 3, the gear wheel being a part of a clock movement which is controlled by any one of a standard type of clock escapement movements, for example, by a pallet 16, and a scape wheel 17; this movement is common in many standard types of clocks and its further description and illustration are not considered to be necessary. The oscillation of the pendulum 7, Fig. 2, controls the frequency of the movement of the escapement, and thereby adjustably controls the downward feed of the heating element 12.

The heating element 12 is provided with channels 18, Fig. 4, made for example of porcelain, in which are placed one or more heating wires 19, 19', Fig. 8, and the channels spaced sufficiently to pass a slice of bread 13 supported by the bread holder 14 during the downward travel of the heating element. The heat from the wires 19, 19', is radiated and reflected directly upon the adjacent bread and toasts the same, the bread being toasted both by radiated and reflected heat, and also by the hot convection currents of heated air which naturally ascend in contact with the sides thereof. Above the refractory channels 18 may be placed "flaps" 22, Figs. 4, 9, and 10, loosely hinged at 23 upon the upper surface of the heating element 12, and which rest loosely against the sides of the bread providing an "oven" to receive heated air and thereby still further add to the toasting of the bread. As the heating element 12 descends, successive areas or "zones" of the bread are toasted as shown in Fig. 2, and when the heating element 12 reaches the bottom as shown in Fig. 3, the bread is completely toasted. Upon reaching the bottom, the stop 25, Figs. 5, and 9, presses against a suitable switch, for example, a spring-retracted mercury switch 27, tilting the same and breaking the circuit. The bread may now be removed and a new slice inserted, the heating element then raised by the handle 30 and the toasting operation repeated. Suitable wires 24 lead from the heating element 12 to the mercury switch 27, and then to the usual contact plug 29.

In Fig. 4 is shown a multiple toaster, capable of toasting three slices of bread at one operation. The heating element 12 is provided with three sets of heating wires, one set adjacent each slice of bread, the heating element being supported upon the bracket 4 as in Fig. 1. In Fig. 7, the bread holder 14 is elongated to hold a plurality of slices of bread 13 one above the other. The operation is otherwise the same as described under Fig. 1.

In Fig. 8 is shown a heating element containing a plurality of heating wires 19', permitting the generation of an intense amount of heat, and thereby shortening the time of toasting. Heating elements of the types shown herein in Figs. 1 and 8 are adapted to generate relatively intense amounts of heat, and effect very rapid toasting. A toaster of the type shown in Figs. 1, 2, and 3, consuming about two hundred watts of electric energy, produced very satisfactory toast in a period of time favorably comparable to that required by several of the standard types of toasters consuming about six hundred watts. Accordingly, a three slice toaster of the type described herein could be made to consume about the same amount of electric energy as a standard type single slice toaster.

In the modification shown in Figs. 9, 10, and 11, upon a base 1 is mounted a suitable small variable speed motor 35, controlled for example, by a resistance 28, the shaft of which drives the bevel gears 36, 37; to the latter of which is secured the vertical worm 38. Loosely sliding upon the worm 38 and guide bar 41 is the bracket 40 provided with a smooth bore through which the worm passes, and upon the bracket is mounted the heating element 12. Projecting from the bracket 40 is a suitable tubular handle 50 through which may pass the wires 51. Mounted upon the handle 50 is the spring controlled latch 43, adapted to engage the worm 38, and provided with the fixed washer 44 and spring 45 which latter presses against the stop 47. To operate this modification, the resistance 28 will be adjusted to a desired motor speed, the latch 43 is withdrawn from engagement with the worm 38 by the latch handle 46, the heating element 12 raised by the handle 50 to the top, and the latch released, whereupon the latch engages the worm 38, the rotation of the latter feeds the heating element downwards and toasts the bread. Upon reaching the bottom, the lug 25 actuates the mercury switch 27, breaking the circuit and stopping the motor. This positive feed type may also be used with the multiple toasters shown in Figs. 4 and 7.

I claim:—

1. A toaster comprising a bread holder, a movable heating element in operative relation to said bread holder, a support for said heating element, mechanism to move said heating element along said support, said mechanism secured to said heating element, a rack on said support, a pinion in said mechanism, said pinion adapted to engage said rack, and means to adjustably control the velocity of movement of said heating element along said support.

2. A toaster comprising a bread holder, a movable heating element in operative relation to said bread holder, a support for said heating element, a clock work movement to move said heating element along said support, said mechanism secured to said heating element, a rack on said support, a pinion in said mechanism, said pinion adapted to engage said rack, and an adjustable pendulum to adjustably control the velocity of movement of said heating element along said support.

3. A toaster comprising a bread holder, a movable heating element in operative relation to said bread holder, a support for said heating element, means to move said heating element along said support, said heating element comprising a refractory channel, a heating wire in said channel, said channel constructed to direct heat rays as a relatively narrow band upon bread to be toasted, and hinged flaps above said heating element adapted to rest against the bread to provide a chamber to receive heated air from said heating element.

4. A toaster comprising a plurality of spaced bread holders, a bank of movable heating elements, a support for said bank of heating elements, said heating elements interlaced with and in operative relation to said bread holders, a clock work movement to progressively move said bank of heating elements, means to control the rate of movement of said bank of heating elements, and hinged flaps above said heating elements adapted to rest against the bread to provide a chamber to receive heated air from said heating element.

5. A toaster comprising a bread holder, a movable heating element body in operative relation to said bread holder, a support for said heating element body, motor driven mechanism to move said heating element body along said support, said mechanism comprising a worm adapted to be rotated by said motor, a movable latch attached to said heating element body adapted to operatively engage said worm, and means to adjustably control the velocity of movement of said heating elevent along said support.

6. A toaster comprising a bread holder, a movable heating element in operative relation to said bread holder, a support for said heating element, motor driven means to move said heating element along said support, said heating element comprising a refractory channel, a heating wire in said channel, said channel constructed to direct heat rays as a relatively narrow band upon bread to be toasted, and hinged flaps above said heating element adapted to rest against the bread to provide a chamber to receive heated air from said heating element.

7. A toaster comprising a bread holder, a movable heating element body in operative relation to said bread holder, a support for said heating element body, a motor, mechanism to move said heating element body along said support, said mechanism comprising a worm adapted to be rotated by said motor, a movable latch attached to said heating element body adapted to operatively engage said worm, means to adjustably control the velocity of movement of said heating element along said support, and a switch to break an electric circuit when said movable heating element has completed its travel.

RALPH W. SHENTON.